May 6, 1969 F. L. MERGNER 3,443,038

RECORDING SYSTEM WITH SIGNAL RETURN CIRCUIT FOR ALLOWING THE USE OF CERTAIN FILTERS AND AMPLIFIERS IN BOTH RECORD AND REPRODUCE MODES

Filed Feb. 1, 1962

INVENTOR
F. L. MERGNER
BY Henry L. Burkitt
ATTORNEY

May 6, 1969 F. L. MERGNER 3,443,038

RECORDING SYSTEM WITH SIGNAL RETURN CIRCUIT FOR ALLOWING THE USE OF CERTAIN FILTERS AND AMPLIFIERS IN BOTH RECORD AND REPRODUCE MODES

Filed Feb. 1, 1962

Sheet 2 of 6

INVENTOR
F. L. MERGNER
BY Henry L. Burkitt
ATTORNEY

INVENTOR
F. L. MERGNER
BY Henry L. Burkitt
ATTORNEY

INVENTOR
F. L. MERGNER
BY Harry L. Burkitt
ATTORNEY

May 6, 1969 F. L. MERGNER 3,443,038

RECORDING SYSTEM WITH SIGNAL RETURN CIRCUIT FOR ALLOWING THE USE OF CERTAIN FILTERS AND AMPLIFIERS IN BOTH RECORD AND REPRODUCE MODES

Filed Feb. 1, 1962 Sheet 5 of 6

INVENTOR
F. L. MERGNER
BY Henry L. Burkitt
ATTORNEY

May 6, 1969 F. L. MERGNER 3,443,038

RECORDING SYSTEM WITH SIGNAL RETURN CIRCUIT FOR ALLOWING THE USE OF CERTAIN FILTERS AND AMPLIFIERS IN BOTH RECORD AND REPRODUCE MODES

Filed Feb. 1, 1962

INVENTOR
F. L. MERGNER
BY Henry L. Burkitt
ATTORNEY

United States Patent Office 3,443,038

Patented May 6, 1969

3,443,038

RECORDING SYSTEM WITH SIGNAL RETURN CIRCUIT FOR ALLOWING THE USE OF CERTAIN FILTERS AND AMPLIFIERS IN BOTH RECORD AND REPRODUCE MODES

Fritz L. Mergner, Forest Hills, N.Y., assignor to Fisher Radio Corporation, Long Island City, N.Y., a corporation of New York Filed Feb. 1, 1962, Ser. No. 170,341
Int. Cl. G11b *5/44, 5/12, 5/02*
U.S. Cl. 179—100.2 9 Claims This invention relates to Recording Systems. It is concerned particularly with systems for recording and reproducing of electrical signals, such as audio, radio or television.

An object of the invention is to reduce materially the number of amplifying circuits, filter and network components utilized in a magnetic recording and reproducing system.

Another object of the invention is to enhance the fidelity and reduce the distortion and noise in magnetic recording and reproducing modes by utilizing substantially the same circuit facilities for both modes.

Another object of the invention is to utilize the same amplifiers, filters, and networks both for the magnetic recording and reproducing modes by switching in a feedback loop during the playback.

One feature of one phase of the invention is a unitary magnetic recording and reproducing system, wherein a loudspeaker functions for monitoring the recording and playback to permit enhancement of the fidelity of the recording.

Another feature of a phase of the invention is a switched feedback loop introduced during the playback mode wherein amplifiers, networks and filters, which have been active for recordings, are utilized for reproducing to enhance the fidelity and reduce the signal distortion.

In accordance with the invention, a magnetic tape recording system is provided with an internal switching and control circuit which permits amplifiers, networks, filters and control circuits, located ahead of the recording head, to be utilized again in the playback mode by switching in a feedback loop located between the playback head and signal source selector for the recorder.

Other objects of the invention will be set forth hereinafter, or will be apparent from the description and the drawings, in which is illustrated an embodiment exemplifying the invention.

The invention, however, is not intended to be restricted to any particular construction, or any particular arrangement of parts, or any particular application of any such construction or arrangement of parts, or any specific method of operation or use, or any of the various details thereof, even where specifically shown and described herein, as the same may be modified in various particulars, or may be applied in many varied relations, without departing from the spirit and scope of the claimed invention, of which the exemplifying embodiment, herein shown and described, is intended only to be illustrative, and only for the purpose of complying with the requirements of the statutes for disclosure of an operative embodiment, but not to show all the various forms and modifications in which the invention might be embodied.

On the drawings, in which the same reference characters refer to the same parts throughout, and in which is disclosed such a practical construction, FIG. 1 is a block diagram of a magnetic tape recorder system, showing the internal switching for the recording mode;

Figures 1, 7, 8:
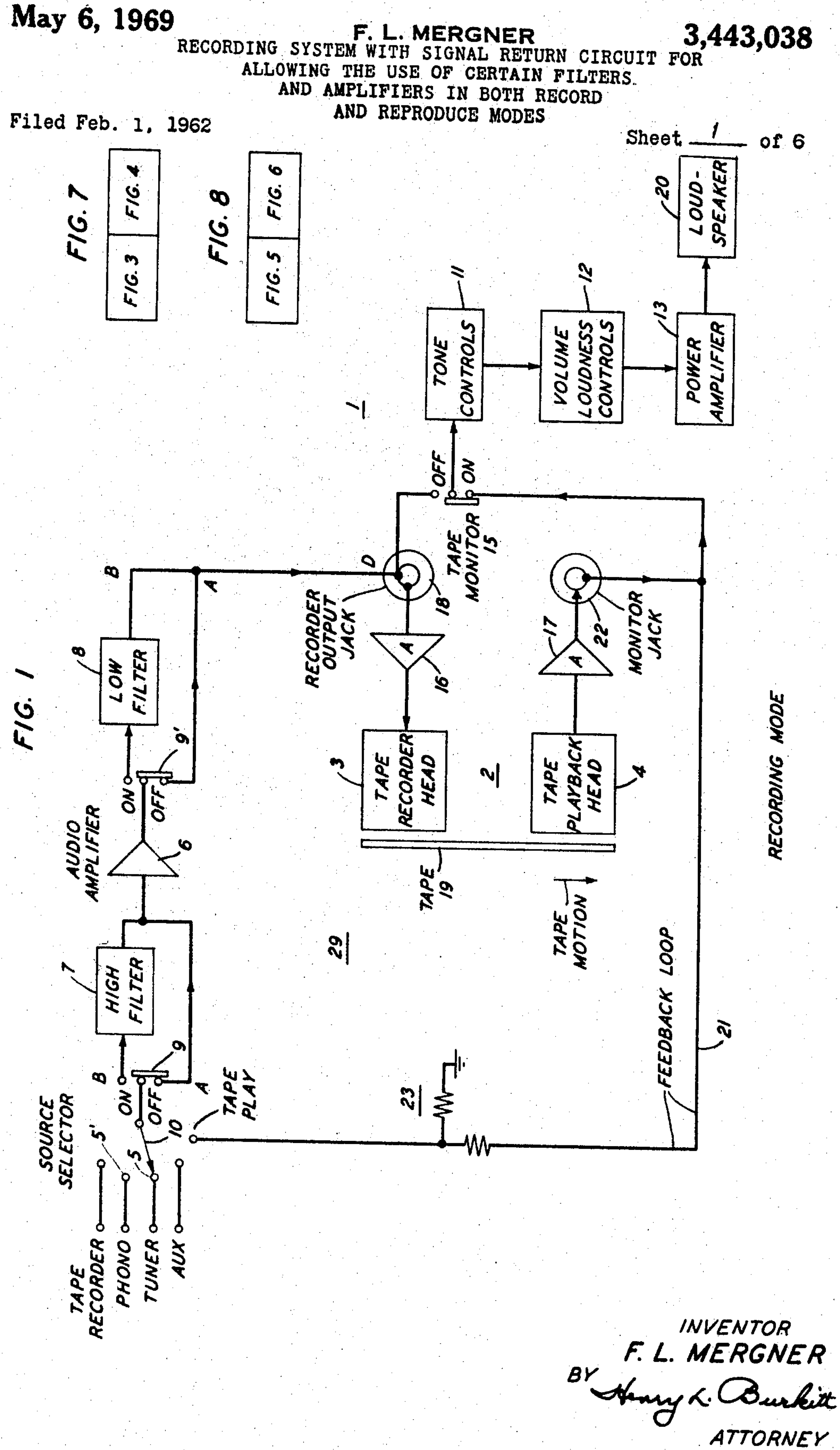
Figure 2:
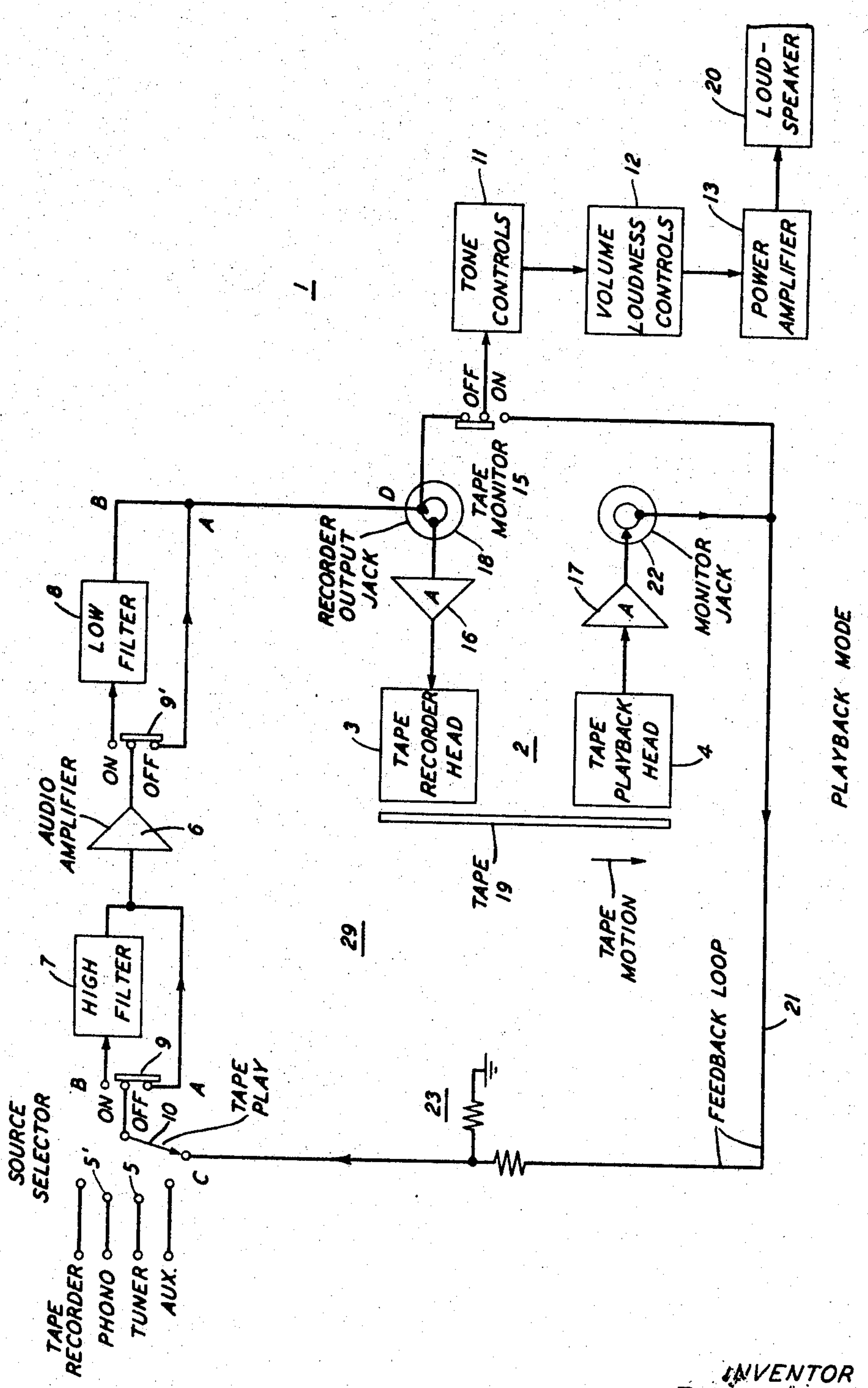
FIG. 2 is a similar block diagram of the system, showing the recorder operated in the playback mode by utilizing internal switching, and a switched-in feedback loop to permit the same circuit facilities to be used in the playback.
Figure 3:
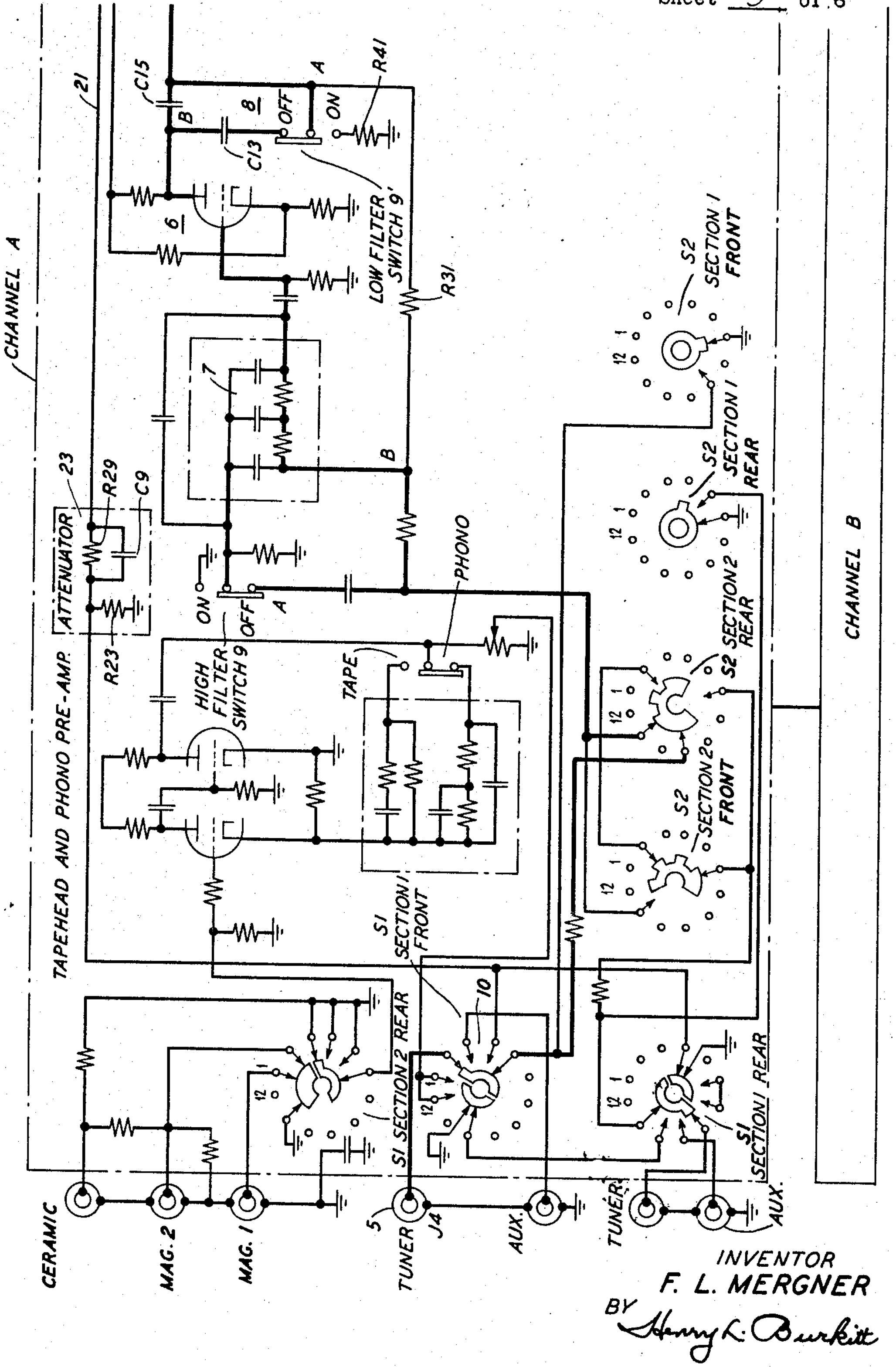
FIGS. 3 and 4 are detailed schematic circuit diagrams corresponding to the block diagram of FIG. 1.
Figure 4:
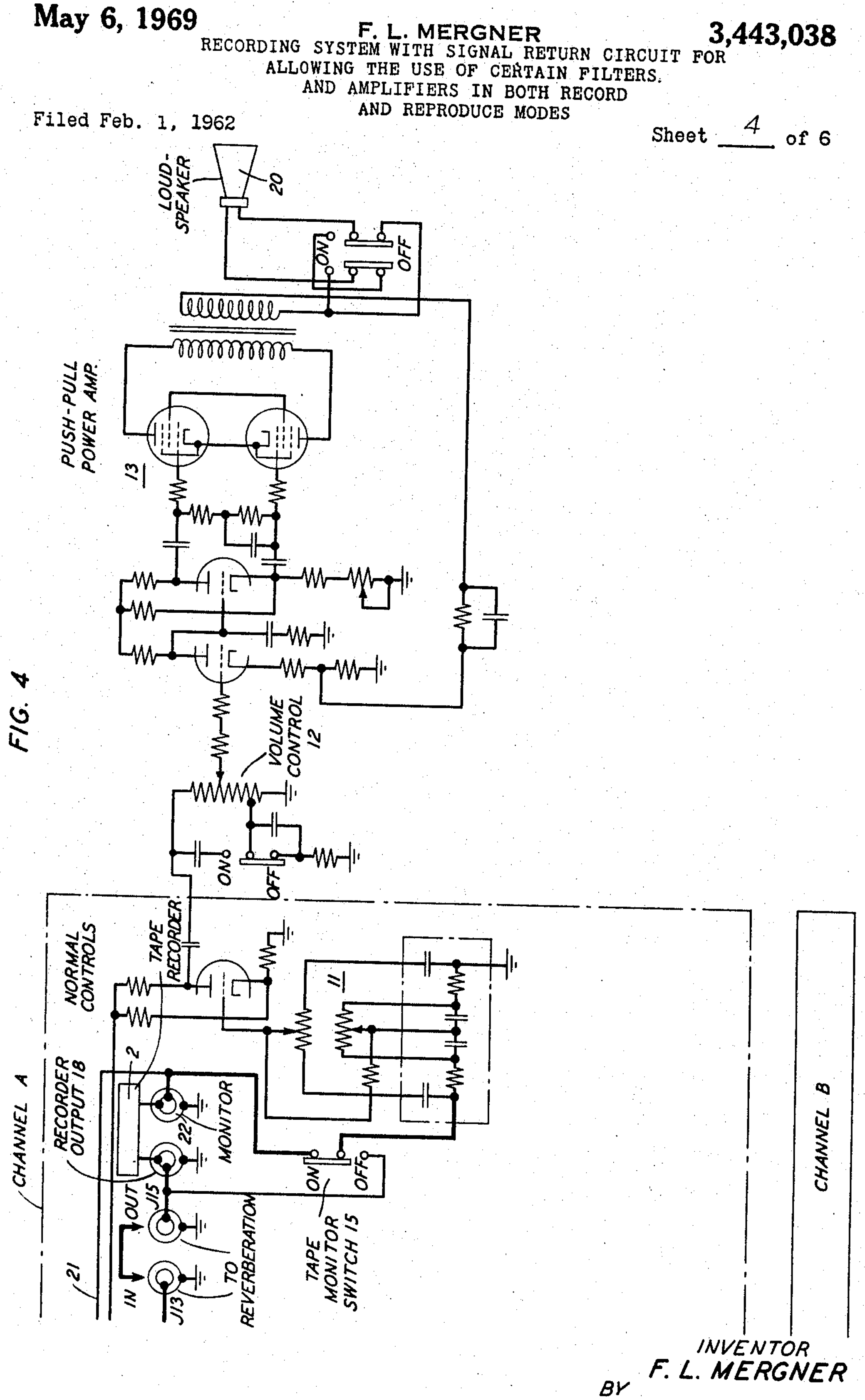
Figure 5:
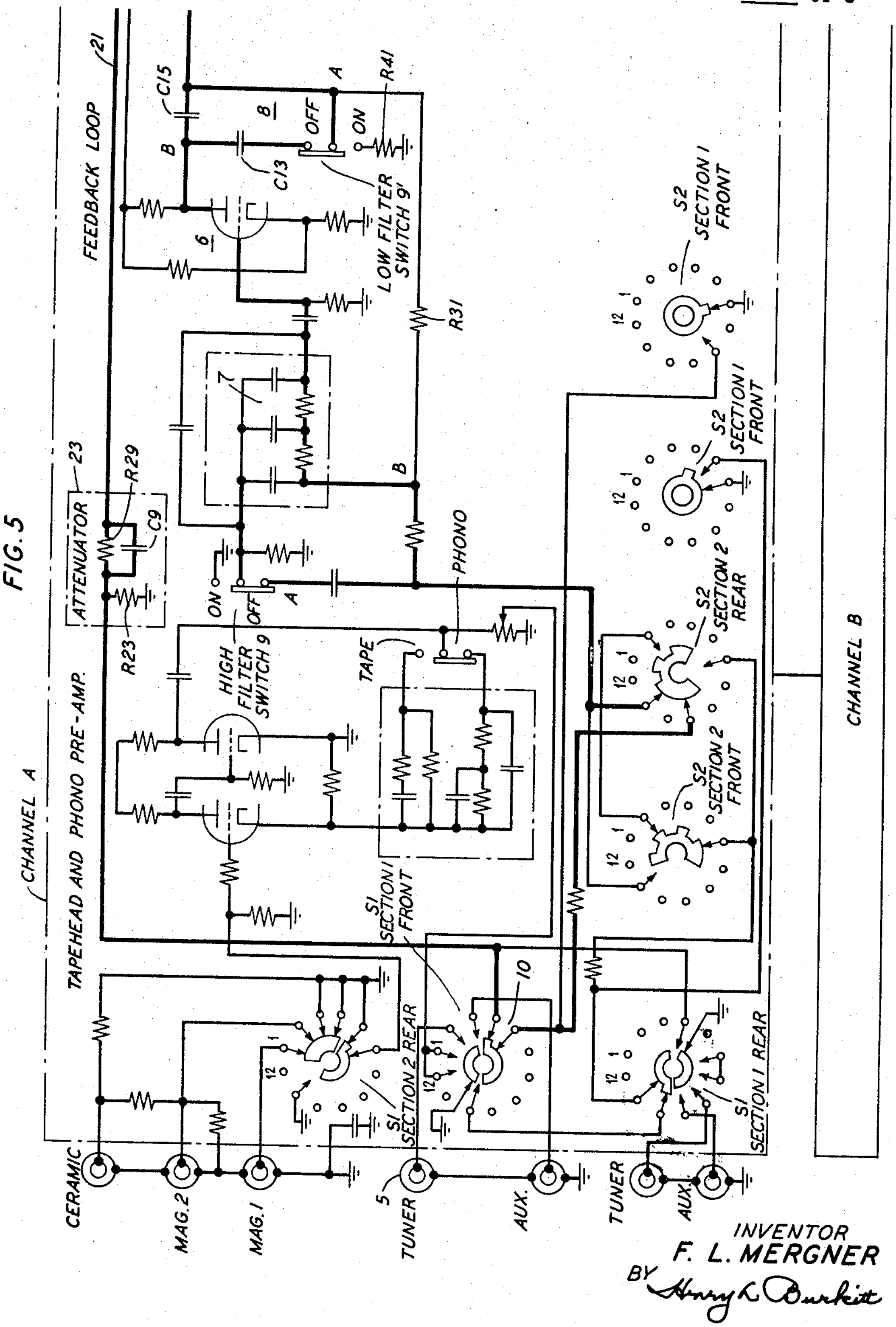
Figure 6:
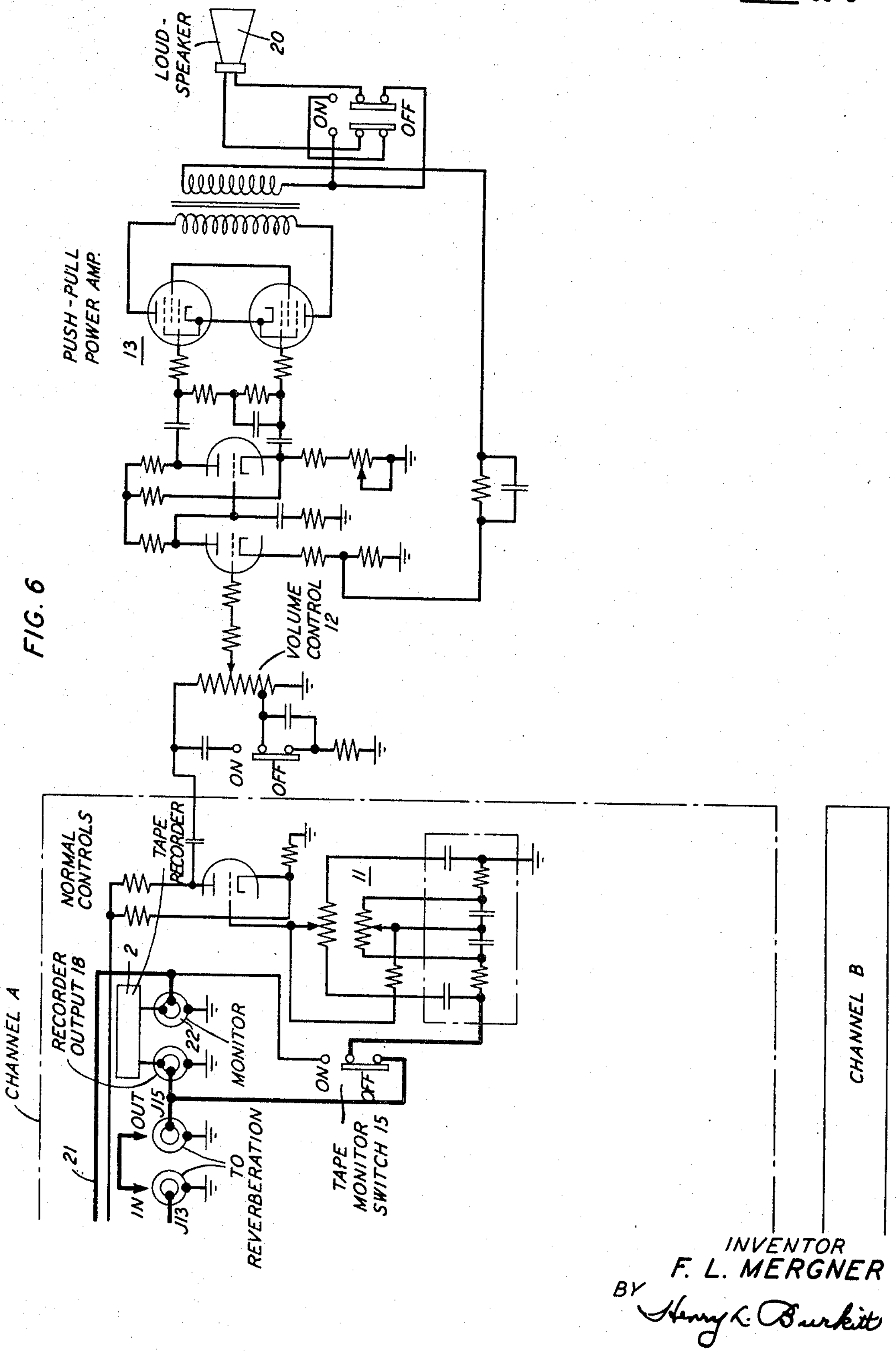

FIGS. 5 and 6 are detailed schematic circuit diagrams corresponding to FIG. 2; and FIGS. 7 and 8 are views to illustrate the manner in which the schematic circuits of FIGS. 3 and 4, and FIGS. 5 and 6, respectively, are related.

Referring to FIG. 1, a magnetic recorder system 1 is shown with the internal switching circuits set for the recording mode by having source selector switch 10 in the tuner position.

Magnetic recorder 2 comprises a recording head 3, and a tape playback head 4, with a magnetic tape 19 moving therebetween, as indicated in FIG. 1, and audio amplifiers 16 and 17. Various models of magnetic recorders are suitable in this connection, such, for example, as the Ampex Tape Recorder Model 960, 601, 1200 and the like, Tandberg Model 6, Concertone 505, Webcor Regent Coronet Model, and the like. In essence, the arrangement in accordance with the invention may be utilized with any tape recorder which has a high level audio output. It is applicable to recorders with two or three magnetic heads and the like.

The recording of signals is made on magnetic tape 19, which passes across and between heads 3 and 4. The input signals are generally derived from various signal sources 5, for example, phonograph, radio, television, or the like, or even from another recorded tape.

These source signals are first amplified in an audio amplifier 6, from which they are transmitted to magnetic recorder 2, either directly along path A—A, or, alternatively through path B—B, via high and/or low pass frequency filters 7, 8, respectively. Filters 7, 8, may serve to remove scratch noises from the source signals, or may provide various professional tonal effects introduced by the operator into the recording at manual switches 9, 9′. As shown in FIG. 1, switches 9, 9′, permit the signals from an input source, for example, a radio turner, as indicated by the position of switch arm 10 for one of sources 5, to pass over direct path A—A, when the instantaneous recording and playback, as revealed at loudspeaker 20, are fully satisfactory to the operator with regard to high fidelity and tonal quality. Should the substantially instantaneous recording and playback not be fully satisfactory, then filters 7 and/or 8 are switched in to eliminate scratch noise, reduce distortion, or introduce desired professional tonal effects.

Under these circumstances, the amplified source signals from the tuner of sources 5 are then recorded on a moving magnetic tape 19 by recorder head 3, and are picked up a fraction of a second later by playback head 4, and are then monitored by the operator by means of loudspeaker 20.

As the source signals are recorded, as shown in FIG. 1, their passage to and from magnetic recorder 2 into loudspeaker 20 are schematically indicated by directed arrows.

As indicated in FIG. 1, the recorded signals from tape playback head 4 are amplified by recorder amplifier 17, whence they pass through a tape monitor switch 15 in the closed position to conventional tone control circuit 11 and volume control circuit 12, power amplifier 13, and thence to loudspeaker 20. Recorder amplifiers 16 and 17 serve to provide suitable levels for the preamplified source signals transmitted through recorder 2.

Referring to FIG. 2, recorder system 1 is shown in the playback mode with source selector switch 10 in the tape play position to connect a feedback loop 21 into the playback-circuits.

As is apparent from FIG. 2, recorder system 1 is much the same as illustrated in FIG. 1, except for the altered position of source selector switch 10 and the utilization of feedback loop 21 in the playback mode to permit the utilization of the same circuit facilities therefor.

Feedback loop 21 extends from the output of playback head 4 and amplifier 17 to point C. With the switch 10 in the tape play position shown in FIG. 2, audio amplifier 6, filters 7, 8, and other desirable circuit facilities utilized in recording may function again during playback to further improve the fidelity and reduce distortion, scratch noises or the like introduced by the magnetic tape head, or other elements, during the recording mode.

With feedback loop 21 activated during playback by source selector switch 10, a closed amplifying circuit loop 29 is set up, including audio amplifier 6, filters 7, 8, together with recorder amplifier 17 of magnetic recorder 2.

The various amplifiers 6, 16 and 17 are available for both modes, i.e., recording and playback of tape recorder 2.

In the playback mode, recorded signals from magnetic tape 19 are picked up and reproduced by playback bead 4, thence amplified by recorder amplifier 17 and fed back over feedback loop 21 to pass through audio amplifier 6 again. If the quality of recorder 2 happens to be poor, filters 7 and/or 8 may now be switched in by the operator to improve and enhance the fidelity and quality of the recorded signals derived from magnetic tape 19. Distortion or scratch noises introduced by tape 19 are thereby eliminated or substantially reduced.

After the signals recorded on tape 19 are played back, they pass from tape monitor switch 15 to loudspeaker 20 in the manner described for FIG. 1, via tone control 11, volume control 12, and the like.

Tape monitor switch 15 and associated tone and volume control circuitry 11, 12, allow monitoring and control of program material being recorded, or played back, by tape recorder system 1. Program material being fed through amplifier 16 can thus be recorded and heard on loudspeaker 20 at virtually the same time.

It should be clearly understood that the tone control 11, volume control 12, and loudspeaker 20 are available and can be utilized for multifold purposes, i.e., instantaneous recording and playback, for monitoring and for listening to recordings, etc.

Various points of amplifying loop circuit 29 can be chosen where the signals fed to the amplifiers can be derived and directed to tape recorder 22. A point D normally splits amplifying circuit 29 into two sections; one prior to, and the other following, recorder output jack 18. All controls following jack 18 permit varying only the signals coming from tape recorder 2, and at other times from any source, to the loudspeaker. This means that controls, such as low and high frequency filters 7, 8, for example, must be electrically located prior to recorder jack 18 in order to allow filtering of the signal before it reaches tape recorder 2. After being recorded, the same signal can be played back, via the remainder of amplifying circuit 29 following monitor input jack 22. This means that all controls in this section can also be used to control the sound being played back. This arrangement allows all or at least a certain maximum number of common circuits, networks, filters and controls to be available for both operations; first, for recording, and second, for play back of the same signal, or even of a signal that has prerecorded on tape.

DETAILED DESCRIPTION OF INTERNAL SWITCHING CIRCUIT FOR TAPE RECORDER

FIGS. 3 and 4 show the operation of tape recorder circuits 1 in the recording mode (by dark lines).

Signals from a radio tuner 5 are applied to input jack J4, and then are routed through Section 1 (front) of input selector switch S1 and Section 2 (rear) of mono-stereo switch S2 to high pass filter 7. This filter does not affect the signals if the HIGH FILTER SWITCH 9 is in the OFF position. Filter 7 sharply attenuates the high frequency components of the signals if switch 9 is in the ON position. The signals from filter 7 are then amplified in triode audio amplifier 6 and applied to low filter circuit 8 consisting of capacitors C13, C15, and resistors R41 and R31. If LOW FILTER SWITCH 9′ is in the OFF position, filter 8 does not affect the signals. If the switch is in the ON position, capacitor C13 is disconnected and filter 8 sharply attenuates the low frequency components of the signals. From the low filter, the signals pass through jacks J13 and J15 (normally connected together by a shorting plug) to RECORDER OUTPUT jack 18.

After tape recorder 2 is connected to RECORDER OUTPUT jack 18 and MONITOR jack 22, these connections need never be disturbed and are permanent during all modes of operation. A reverberation device (not shown) could be connected in lieu of the shorting plug ahead of RECORDER OUTPUT jack 18 if desired. Therefore, it too can be used during both the tape playback mode, in a manner similar to the manner in which the high and low frequency filters 7, 8, are switched actively into circuit. From this point, the signals would be fed to the tape recorder's recording amplifier 16 and recorder head 3. A small fraction of a second later, the same signals would be picked up by the tape recorder's playback head 4, amplified in recorder amplifier 17, and then fed to MONITOR jack 22. From this jack, the signals pass through TAPE MONITOR switch 15 (shown in the ON position) to tone control circuit 11, and thence to the remaining volume control circuits 12. These circuits adjust the total balance and volume level of the signals before they reach power amplifier stages 13 and loudspeaker 20.

FIGS. 5 and 6 show (by dark lines) the internal switching circuits for tape recorder system 1 used during the playback mode of operation. The signals from tape recorder 2 (fed to MONITOR jack 22) are applied, by feedback loop 21, through attenuator network 23, consisting of capacitor C9 and resistors R29 and R23, through Section 1 (front) of switch S1 and Section 2 (rear) of switch S2, to high filter 7. From this point to jack J15, the circuit operation is identical to that described previously. In this mode of operation, however, the signals from jack J15 are fed through TAPE MONITOR switch 15 (shown in the OFF position) directly to tone control circuit 11, power amplifier 13, and loudspeaker 20.

Many other changes could be effected in the particular constructions, and in the methods of use and construction, and in specific details thereof, hereinbefore set forth, without substantially departing from the invention intended to be defined herein, the specific description being merely of an embodiment capable of illustrating certain principles of the invention.

What is claimed as new and useful is:

1. The combination with a tape recorder including a recording head, a playback head, means for moving a tape past the heads, each of the heads having its own amplifier, means for supplying a signal to the recording head, and a transducer; of a filter-amplifying circuit, a feedback circuit, means operative when the tape recorder is set for recording to connect the signal supplying means to feed its signal through the filter-amplifying circuit and the recording head amplifier to the recording head while making the feedback circuit ineffective, means for passing a signal derived by means of the playback head from the moving tape through the playback head amplifier to the transducer, and means operative when the tape recorder is set for playback to feed the derived signal through the playback amplifier, the feedback circuit and the filter-amplifying circuit to the transducer.

2. The combination with a tape recorder including a recording head, a playback head, means for moving a tape past the heads, each of the heads having its own amplifier, means for supplying a signal to the recording head, and a transducer; of a secondary circuit including filter and amplifying means, means associated with the secondary circuit for determining the effectiveness of the filter means, a feedback circuit, means operative when the tape recorder is set for recording to connect the signal supplying means to feed its signal through the secondary circuit and the recording head amplifier to the recording head while making the feedback circuit ineffective, means for passing a signal derived by means of the playback head from the moving tape through the playback head amplifier to the transducer, and means operative when the tape recorder is set for playback to feed the derived signal through the playback amplifier, the feedback circuit and the secondary circuit to the transducer.

3. The combination with a tape recorder including a recording head, a playback head, means for moving a tape past the recording head and then past the playback head, each of the heads having its own amplifier, means for selectively supplying a signal to the recording head from a plurality of sources, and a transducer; of a filter-amplifying circuit, a feedback circuit, means operative when the tape recorder is set for recording to connect the signal supplying means to feed its signal through the filter-amplifying circuit and the recording head amplifier to the recording head while making the feedback circuit ineffective, means for monitoring the signal being recorded at the recording head by passing a signal derived by means of the playback head from the moving tape through the playback head amplifier to the transducer, and means operative when the tape recorder is set for playback to obtain a signal from a tape moving past the playback head and feed the obtained signal through the playback amplifier, the feedback circuit and the filter-amplifying circuit to the transducer.

4. The combination with a tape recorder including a recording head, a playback head, means for moving a tape past the recording head and then past the playback head, each of the heads having its own amplifier, means for selectively supplying a signal to the recording head from a plurality of sources, and a transducer; of a secondary circuit including filter and amplifying means, means asociated with the secondary circuit for determining the effectiveness of the filter means, a feedback circuit, means operative when the tape recorder is set for recording to connect the signal supplying means to feed its signal through the secondary circuit while making the feedback circuit ineffective, the secondary circuit and the recording head amplifier having a common junction, means for selectively connecting said common junction or the playback head amplifier to the transducer, means for monitoring the signal being recorded at the recording head by deriving a signal by means of the playback head from the moving tape, the selective connecting means being operative then as means to cause the derived signal from the playback head to pass through the playback head amplifier to the transducer, and means operative when the tape recorder is set for playback to obtain a signal from a tape moving past the playback head, the selective supplying means and the selective connecting means being operative then as means for causing the obtained signal to pass through the playback amplifier, the feedback circuit and the secondary circuit to the transducer.

5. The combination with a tape recorder including a recording head, a playback head, means for moving a tape past the recording head and then past the playback head, each of the heads having its own amplifier, means for selectively supplying a signal to the recording head from a plurality of sources, and a transducer; of a secondary circuit including amplifying means, means associated with the secondary circuit for determining the effectiveness of the circuit, a feedback circuit, means operative when the tape recorder is set for recording to connect the signal supplying means to feed its signal through the secondary circuit while making the feedback circuit ineffective, the secondary circuit and the recording head amplifier having a common junction, means for selectively connecting said common junction or the playback head amplifier to the transducer, means for monitoring the signal being recorded at the recording head by deriving a signal by means of the playback head from the moving tape, the selective connecting means being operative then as means to cause the derived signal from the playback head to pass through the playback head amplifier to the transducer, and means operative when the tape recorder is set for playback to obtain a signal from a tape moving past the playback head, the selective supplying means and the selective connecting means being operative then as means for causing the obtained signal to pass through the playback amplifier, the feedback circuit and the secondary circuit to the transducer.

6. The combination with a tape recorder including a recording head, a playback head, means for moving a tape past the recording head and then past the playback head, each of the heads having its own amplifier, means for selectively supplying a signal to the recording head from a plurality of sources, and a transducer; of a secondary circuit including amplitude and frequency control means and amplifying means, means associated with the secondary circuit for determining the effectiveness of the amplitude and frequency control means, a feedback circuit, means operative when the tape recorder is set for recording to connect the signal supplying means to feed its signal through the secondary circuit while making the feedback circuit ineffective, the secondary circuit and the recording head amplifier having a common junction, means for selectively connecting said common junction or the playback head amplifier to the transducer, means for monitoring the signal being recorded at the recording head by deriving a signal by means of the playback head from the moving tape, the selective connecting means being operative then as means to cause the derived signal from the playback head to pass through the playback head amplifier to the transducer, and means operative when the tape recorder is set for playback to obtain a signal from a tape moving past the playback head, the selective supplying means and the selective connecting means being operative then as means for causing the obtained signal to pass through the playback amplifier, the feedback circuit and the secondary circuit to the transducer.

7. The combination with a tape recorder including a recording head, a playback head, means for moving a tape past the heads, means for supplying a signal for the recording head, and a transducer; of a secondary circuit including amplitude and frequency control means and amplifying means, means associated with the secondary circuit for determining the effectiveness of the secondary circuit, a feedback circuit, means operative when the tape recorder is set for recording to connect the signal supplying means to feed its signal through the secondary circuit and the recording head while making the feedback circuit ineffective, and means operative when the tape recorder is set for playback for feeding the signal obtained from a tape moving past the playback head through the feedback circuit and the secondary circuit to the transducer.

8. The combination with a tape recorder including a recording head, a playback head, means for moving a tape past the heads, means for supplying a signal to the recording head, and a transducer; of a secondary circuit including amplitude and frequency control means and amplifying means, means associated with the secondary circuit for determining the effectiveness of the amplitude and frequency control means, a feedback circuit, means operative when the tape recorder is set for recording to connect the signal supplying means to feed the signal through the secondary circuit and the recording head while making the feedback circuit ineffective, means operative when the tape recorder is set for playback to feed the signal obtained from a tape moving past the playback head through the feedback circuit and the secondary circuit to the transducer.

9. The combination with a tape recorder including a recording head, a playback head, means for moving a tape past the heads, means for supplying a signal to the recording head, and a transducer; of a secondary circuit including amplitude and frequency control means and amplifynig means, a feedback circuit, means operative when the tape recorder is set for recording to connect the signal supplying means to feed its signal through the secondary circuit and the recording head while making the feedback circuit ineffective, means for monitoring the signal being recorded at the recording head by deriving a signal by means of the playback head, means for passing the derived signal from the playback head to the transducer, means operative when the tape recorder is set for playback to feed the signal obtained from a tape moving past the playback head through the feedback circuit and the secondary circuit to the transducer.

References Cited

UNITED STATES PATENTS

| | | | |
|---|---|---|---|
| 2,641,655 | 6/1953 | Bobb | 179—100.2 |
| 2,909,617 | 10/1959 | Shields | 179—100.2 |
| 2,468,782 | 5/1949 | Ross et al. | 179—100.2 |
| 2,539,121 | 1/1951 | Dashiell | 179—100.2 |
| 2,654,003 | 9/1953 | Dashiell | 179—100.2 |
| 2,694,108 | 11/1954 | Taylor | 179—100.2 |
| 2,756,277 | 7/1956 | Good et al. | 179—100.2 |
| 2,965,722 | 12/1960 | Shorb | 179—100.2 |
| 2,971,063 | 2/1961 | Genning | 179—100.2 |
| 2,975,238 | 3/1961 | Jones | 179—100.2 |

BERNARD KONICK, *Primary Examiner.*

J. RUSSELL GOUDEAU, *Assistant Examiner.*